(No Model.) 5 Sheets—Sheet 1.
G. RICHARDSON.
MACHINE FOR MAKING CONDUITS.
No. 392,069. Patented Oct. 30, 1888.
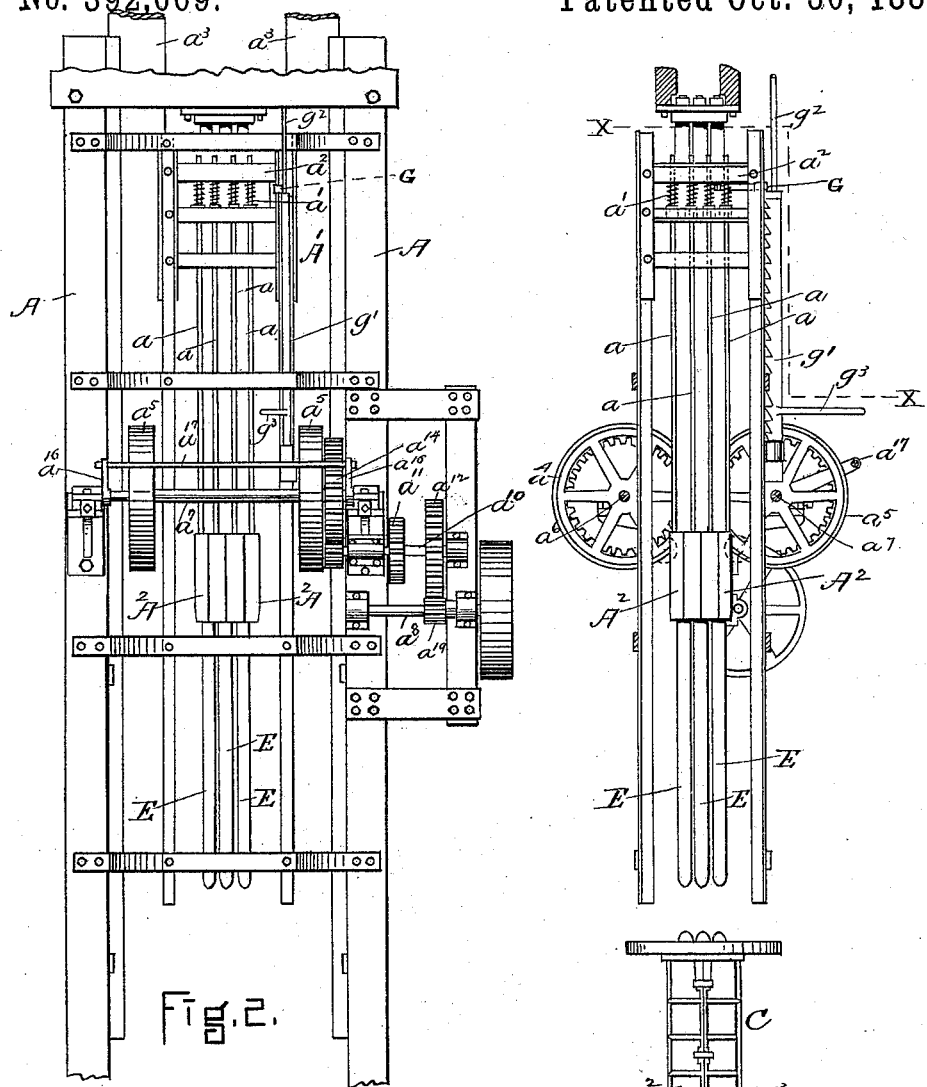
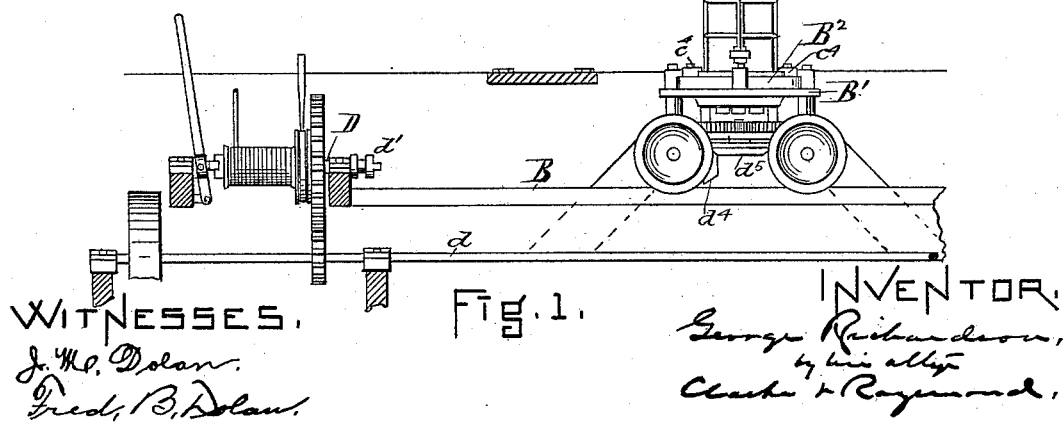
Fig. 1.
Witnesses:
J. M. P. Dolan.
Fred. B. Dolan.
Inventor:
George Richardson,
by his attys
Clarke & Raymond.

(No Model.)  
G. RICHARDSON.  
MACHINE FOR MAKING CONDUITS.  
No. 392,069. Patented Oct. 30, 1888.

WITNESSES.  
INVENTOR.

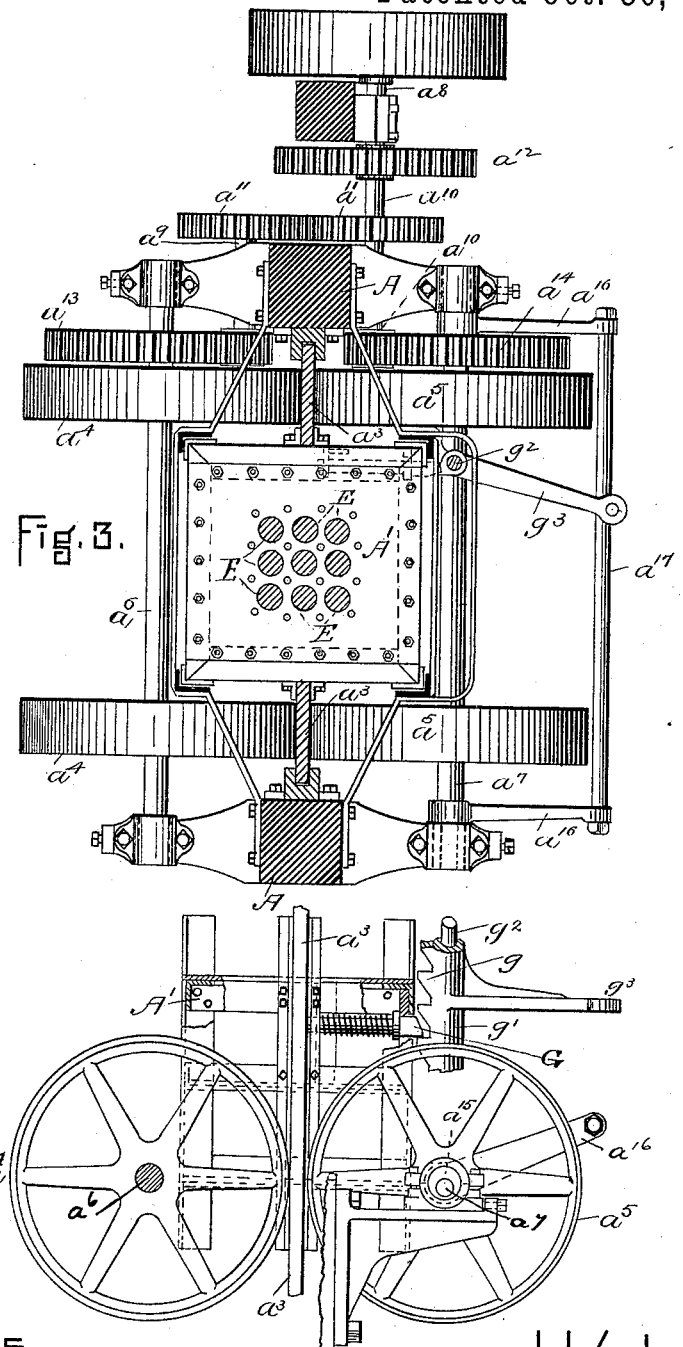

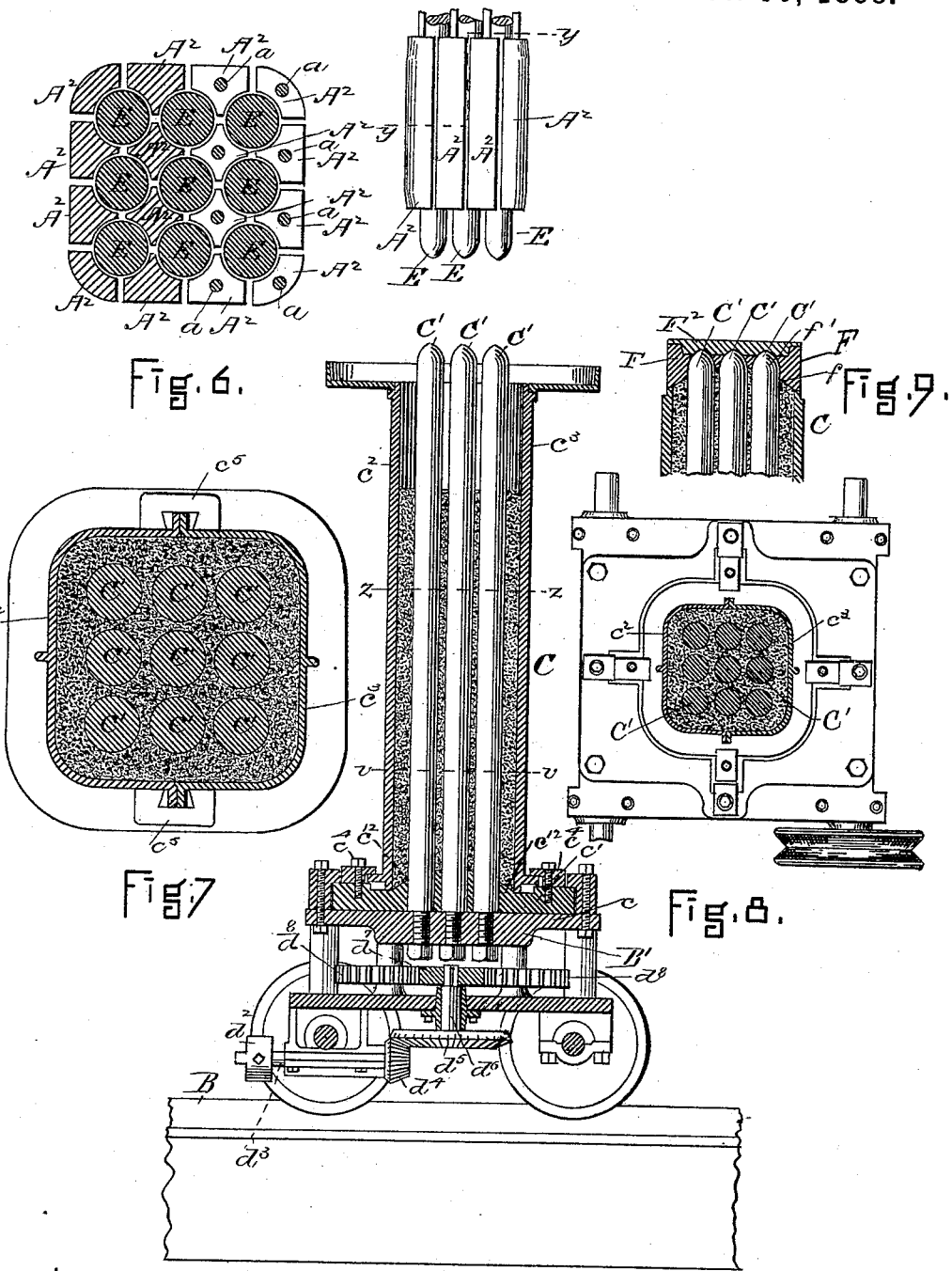
(No Model.)  5 Sheets—Sheet 3.
G. RICHARDSON.
MACHINE FOR MAKING CONDUITS.
No. 392,069.  Patented Oct. 30, 1888.

(No Model.)
G. RICHARDSON.
MACHINE FOR MAKING CONDUITS.
No. 392,069.  Patented Oct. 30, 1888.
5 Sheets—Sheet 4.
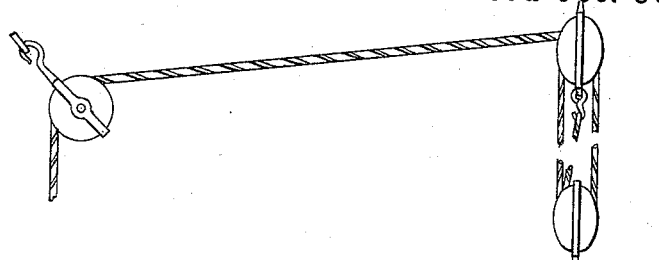
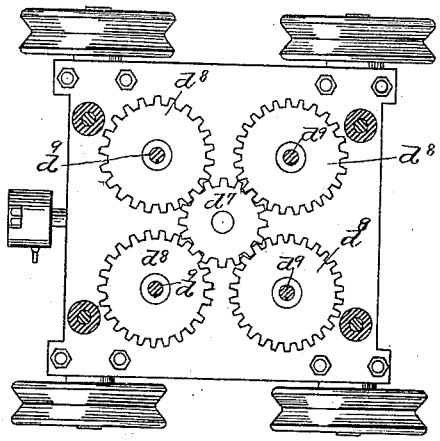
Fig. 11.
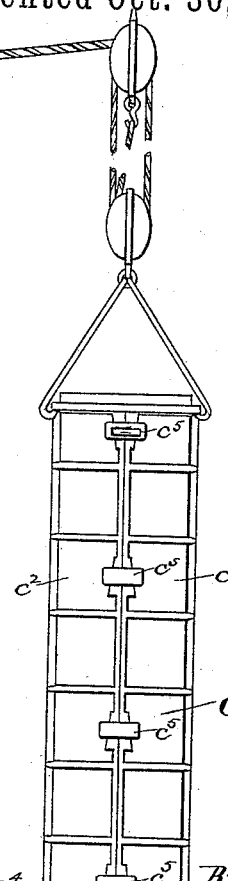
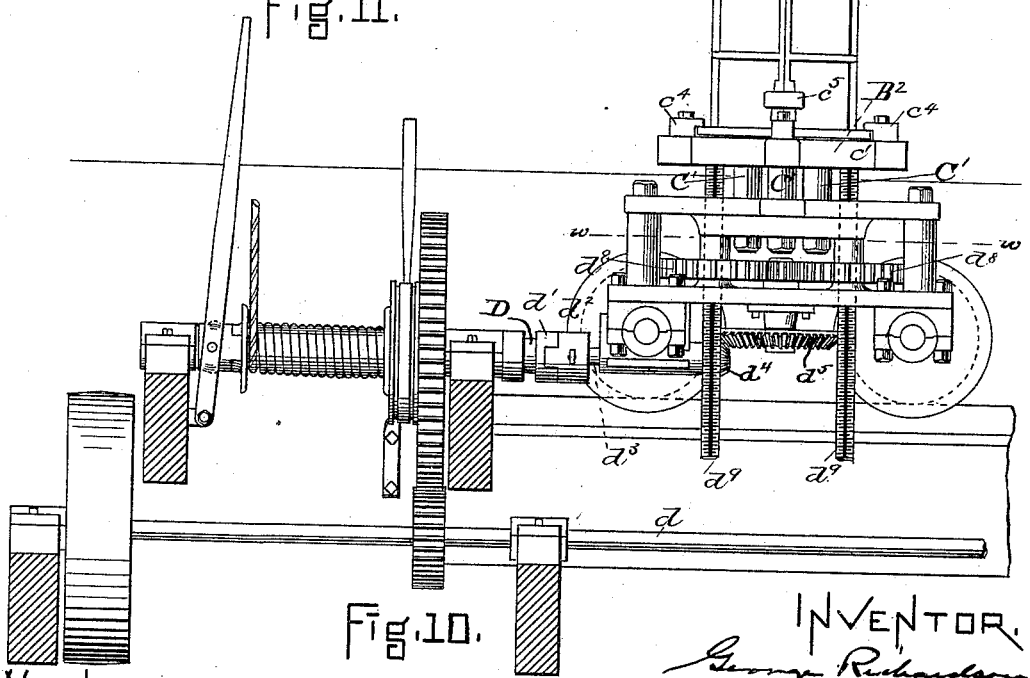
Fig. 10.
WITNESSES.
INVENTOR.

(No Model.) 5 Sheets—Sheet 5.

G. RICHARDSON.
MACHINE FOR MAKING CONDUITS.

No. 392,069. Patented Oct. 30, 1888.

WITNESSES.
J. M. Dolan,
Fred. B. Dolan.

INVENTOR.
George Richardson.
by his atty
Clarke & Raymond

UNITED STATES PATENT OFFICE.

GEORGE RICHARDSON, OF BOSTON, MASSACHUSETTS, ASSIGNOR TO THE AMERICAN CONDUIT AND CONSTRUCTION COMPANY, OF PORTLAND, MAINE.

MACHINE FOR MAKING CONDUITS.

SPECIFICATION forming part of Letters Patent No. 392,069, dated October 30, 1888.

Application filed June 8, 1887. Serial No. 240,595. (No model.)

*To all whom it may concern:*

Be it known that I, GEORGE RICHARDSON, of Boston, in the county of Suffolk and State of Massachusetts, a citizen of the United States, have invented a new and useful Improvement in Machines for Making Conduits, of which the following is a full, clear, and exact description, reference being had to the accompanying drawings, forming a part of this specification, in explaining its nature.

The invention relates to a machine for making conduits for electric conductors and other purposes, similar to that described in my patent, No. 259,046, dated June 6, 1882; and it consists, essentially, in a box or mold carrying a series of formers or mandrels, preferably arranged vertically, the mold having an opening at the top through which the cement or other material for forming the conduit is fed, and a series of independent tamps carried by a carriage or frame adapted to have a drop movement similar to that given the head of a drop-press.

The invention further consists in various details of construction and organization, all of which will be hereinafter described.

Figures 1, 2:
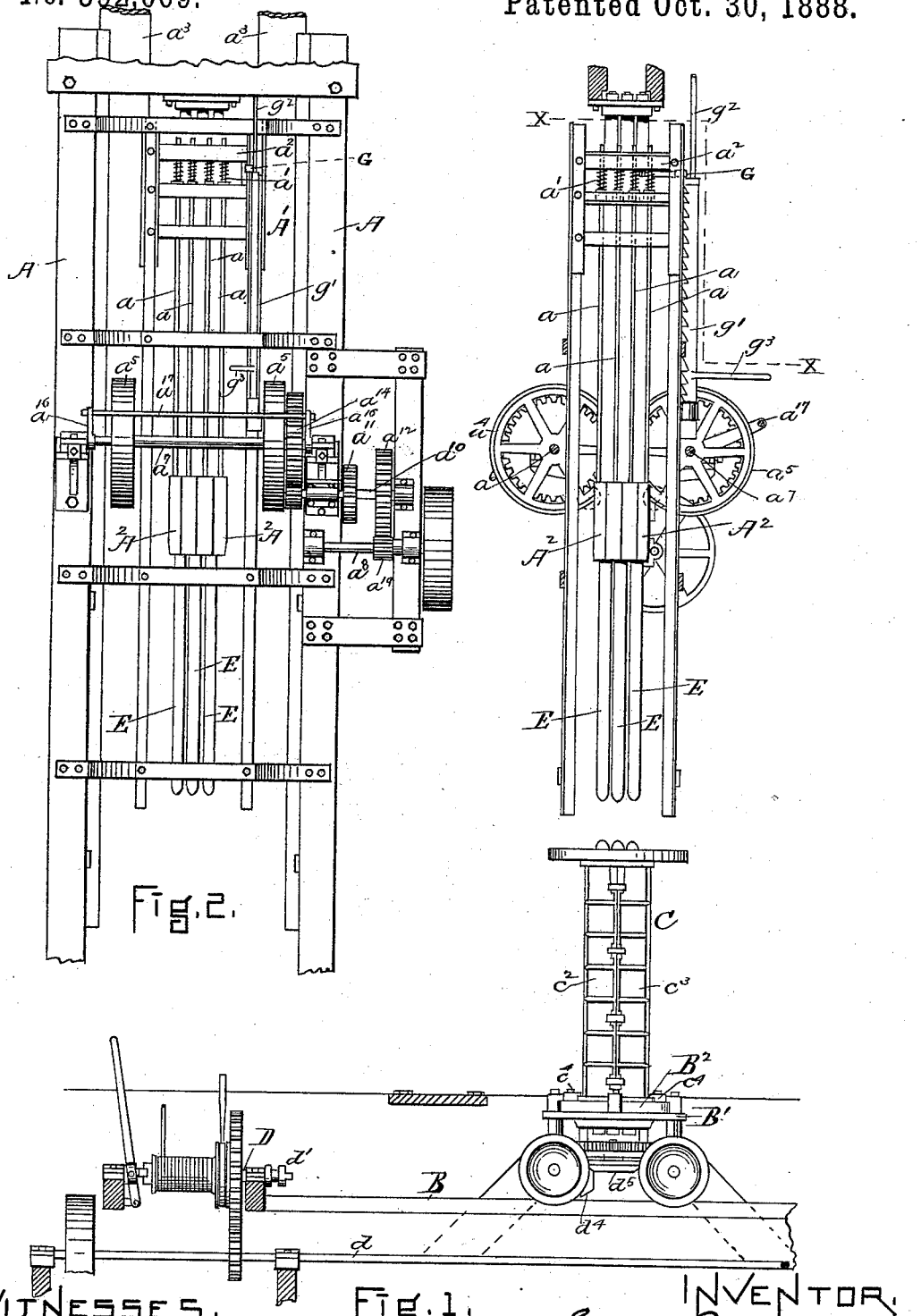
Figure 12:
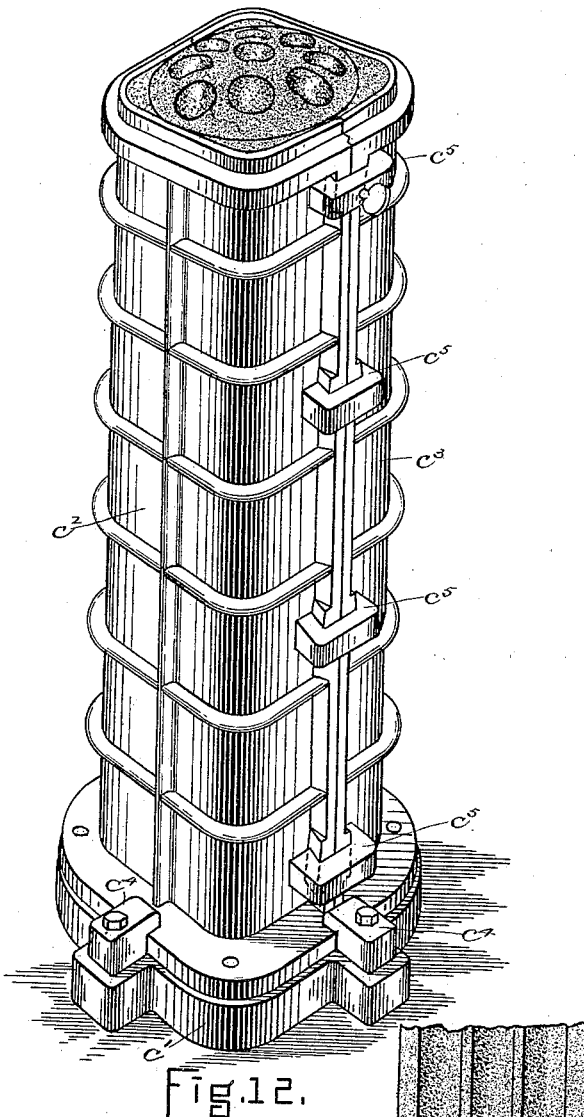
Figure 13:
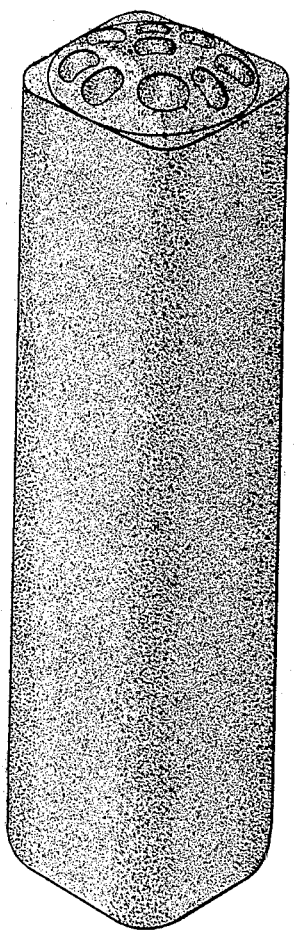
Figure 14:
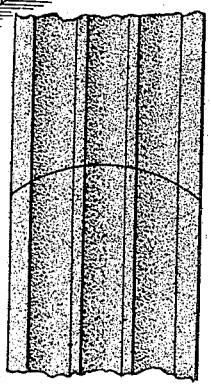

In the drawings, Figure 1 is a view, partly in vertical section and partly in side elevation, of my improved machine. Fig. 2 is a view, enlarged, in front elevation, representing principally the frame carrying the head or cage supporting the tamps, the tamps and mechanism for lifting them, and their guides. Fig. 3 is a view in horizontal section, enlarged, upon the dotted lines $x$ $x$ of Fig. 1. Fig. 4 is a detail view in section and elevation to show a portion of the mechanism for lifting the head or cage. Fig. 5 is a vertical section taken through the truck and the mold or box carried thereby, and also showing the formers or mandrels in elevation and the tamps and their guides in elevation. Fig. 6 is a horizontal section, enlarged, upon the line $y$ $y$ of Fig. 5. Fig. 7 is a horizontal section, enlarged, upon the line $z$ $z$ of Fig. 5. Fig. 8 is a horizontal section upon the line $v$ $v$ of Fig. 5. Fig. 9 is a view in vertical section of the upper part of the mold or box with the finishing-blocks in place thereon. Fig. 10 is a view in side elevation representing the process of removing the mold or box from the molded conduit. Fig. 11 is a view in horizontal section upon the dotted line $w$ $w$ of Fig. 10, also showing in plan the parts below said line. Fig. 12 is a view in perspective, enlarged, of the box or mold with a conduit-section therein after it has been removed from the truck and formers or mandrels. Fig. 13 is a view in perspective, enlarged, of a completed conduit. Fig. 14 is a view in section showing the abutting ends of two sections to represent the manner of joining the same.

Referring to the drawings, A is a frame upon which there is arranged to move vertically a carriage or head, A', Fig. 2, supporting a series of independent tamps, A². This frame is arranged across and above a track upon which one or more trucks, each of which carries a mold or box, and the formers or mandrels therefor, and certain other necessary appliances, are adapted to be moved to bring the case or box beneath the tamps. In the drawings I have represented but one of these trucks.

B represents the tracks.

B' is the truck. Each truck supports a mold or box, C, and the mandrels or formers C'. The mandrels or formers are attached to a plate, $c$, fastened to the trucks, and the case or mold is adapted to be vertically movable in relation to the formers or mandrels—first by means of a lifting device carried by the truck, and afterward by a tackle. The first lifting mechanism, or that carried by the truck, must be sufficiently powerful to lift the mold-box and compressed conduit from the mandrels or formers. In other words, they draw or force the molded conduit from the mandrels, and I have represented for this purpose the mechanism shown in Figs. 1, 5, 10, and 11. It is adapted to be operated by the shaft D, which is connected with the shaft $d$, and which has a section, $d'$, of a clutch, (see Fig. 1,) which engages with a section, $d^2$, of a clutch on the bevel-gear shaft $d^3$ of the truck when the truck has been moved into the position shown in Fig. 10.

The bevel-gear shaft $d^3$ (see Figs. 5 and 10)

carries at its inner end the bevel-gear $d^4$, which engages the bevel-gear $d^5$ on the vertical shaft $d^6$. The shafts $d^3$ $d^6$ are carried by the truck. The shaft $d^6$ has the spur-gear $d^7$, which meshes with the gears $d^8$. (See Fig. 11.) There are four of these gears $d^8$, and each of them is keyed to a screw-shaft, $d^9$. These screw-shafts extend upward into screw-holes in the base-piece of the mold or box C, and they serve to lift the mold or box and the conduit-section therein from the formers C', as represented in Fig. 10, and this serves to release the conduit-section from the formers or mandrels, so that the box or mold, with the conduit-section therein, can then be entirely removed from the mandrels by means of a tackle. (See Fig. 10.)

The box or mold is made in three principal parts—namely, the base-plate $c'$, which has the convex forming-surface $c^{12}$, (see Fig. 5,) which forms the bottom of the box or mold, and two vertical sections, $c^2$ $c^3$, (see Figs. 1, 5, 10, and 12,) which are united to the base $c'$ by the movable blocks $c^4$ in a manner to permit them to be readily detached therefrom. The two sections $c^2$ $c^3$ are fastened to each other by ties $c^5$, (see Fig. 12,) which are also readily removed. This enables the box or mold to be quickly removed from the conduit-section.

The mandrels or formers may be rigidly secured to their base-plate $c$, or they may be secured thereto in a manner to permit them to be slightly moved or oscillated, and they are of a length to extend, when the mold or box is in its lowest position, slightly above the top of the same, (see Fig. 1,) and they preferably are made somewhat tapering from their base to their top, in order to give sufficient clearance on the removal of the molded conduits from them.

In the drawings I have represented a machine adapted to make a conduit with nine longitudinal holes or passages extending through it, with one end provided with the cavity and with the other end correspondingly convex. (See Figs. 13 and 14.) Each tamp is of a shape to compact the cement or material used in forming into a certain section of the conduit, and there are used in making the conduit with nine holes or passages nine formers or mandrels and sixteen tamps, and these tamps are formed to fit the spaces between the mandrels or formers and the sides of the mold, and also between the various mandrels or formers themselves, as shown in Fig. 6, so that they form a sectional plunger which fills the cavity of the mold about the formers or mandrels and compacts all the cement or other material of which the conduit is formed that is fed into the mold. The tamps are guided during a certain part of the vertical movement of the carriage or head supporting them by means of stationary guides E, which are arranged upon the same line as the mandrels or formers. In fact, they extend vertically upward from them. The tamps upon leaving the ends of these stationary guides immediately come into contact with the upper ends of the mandrels and are guided by them. Each tamp is supported by a rod, $a$, (see Fig. 2,) which is secured or attached at its upper end to the carriage or head in a manner to allow a certain amount of movement of the rod relatively to the carriage.

In making the conduit a comparatively small amount of the cement or other material is first introduced into the mold and then tamped, and the building of the conduit continues in this manner—that is, the cement or other material is fed to the mold in small quantities, and after each feeding the tamps are reciprocated a number of times to solidify it until the entire section is completed. The entire conduit is thus compressed or solidified to the same extent throughout, and is more solidified than if it were entirely formed by one pressure or tamping. This manner of building the conduit necessitates that the tamps should be dropped to any level between the bottom or very nearly the bottom of the mold-box and its top.

Each tamp $A^2$ has a limited movement in the common supporting-head independent of the others, in order that they may each strike an effective blow without regard to the blows struck by the others. This effect is produced by making each rod $a$ movable to a limited extent in the head or carriage, as above indicated, and also by arranging a spring, $a'$, about each rod $a$, to bear against the under surface of the cross-bar $a^2$ and upon a collar made fast to the rod. (See Fig. 2.) These springs maintain the tamps in a uniform position in relation to each other and to the carriage when delivering their blow, and act to deliver to the tamps the force of the blow, but with a yielding instead of a rigid effect.

The carriage is made of a suitable frame, and has the wings $a^3$ extending from each side thereof, (see Fig. 3,) which are adapted to be engaged by the lifting-rolls $a^4$ $a^5$. The lifting-rolls $a^4$ are upon the shaft $a^6$, and the lifting-rolls $a^5$ are upon the shaft $a^7$. The shafts $a^6$ $a^7$ are rotated from the shaft $a^8$ by means of the short shafts $a^9$ $a^{10}$. These shafts have the intermeshing gear $a^{11}$ $a^{12}$, the gear $a^{12}$ being run by a pinion, $a^{19}$, upon the shaft $a^8$. The shaft $a^9$ has a pinion which meshes with the gear $a^{13}$ on the shaft $a^6$, and the shaft $a^{10}$ has a pinion which meshes with the gear $a^{14}$ on the shaft $a^7$. The wheels or rolls $a^5$ have a horizontal movement in relation to the rolls $a^4$, for the purpose of enabling them to be moved toward the rolls $a^4$ when it is desired that the head or carriage and the tamps be lifted, and to be moved from them at the end of such movement, in order that the carriage or head may be permitted to drop. This movement is provided by mounting the shaft $a^7$ in eccentric bearings $a^{15}$, (see Fig 4,) and of course upon the turning of these eccentrics in their supports the shaft $a^7$ and the rolls or wheels $a^5$ are either moved toward or from the rolls $a^4$.

This turning movement is given the eccentrics by means of the levers $a^{16}$, connected therewith, (see Fig. 3,) and the cross-bar $a^{17}$.

To lock the head or carriage at the end of its upward movement, I use the spring-latch G, (see Fig. 4,) which is adapted to engage the teeth $g$ upon a sleeve, $g'$, mounted on the rod $g^2$. This sleeve $g'$ has a handle, $g^3$, by which it is turned to disengage a tooth from the ratchet. (See Figs. 3 and 4.)

To prevent the latching of the head or carriage, the sleeve is turned to remove the ratchet-teeth from the line of reciprocation of the latch, and to release the head or carriage after it has been locked in its highest position the sleeve is turned by the handle $g^3$ to remove the holding-tooth from the ratchet.

To form the rounded or convex end of the conduit, there is used a block, F, (see Fig. 9,) having a rounded or concave forming-surface, $f$, and holes $f'$, said block being adapted to be placed upon the top of the mold-box, the ends of the mandrels extending into the holes $f'$, and this block is forced downward upon the cement or other material forming the upper end of the conduit by striking its upper surface with the tamps. The upper surface preferably has a plate of lead, $F^2$, which forms the surface upon which the tamps strike.

In use the mold or box is lifted by the tackle and lowered upon the mandrels or formers, which are assembled upon a truck, and the mold fastened to the tamp, and the truck is then moved on its tracks under the tamps. The cement or other material is then fed in any desired way to the box, and when a sufficient quantity has been introduced the tamps are dropped into the mold and the material compressed therein by as many blows as it may be desired to give it. The tamps are then held lifted, more material is introduced, and the tamps operated as before until the mold is filled, the material being tamped as often as may be desired. When the mold or box is filled and tamped, more material is heaped upon the top of the box about the formers, and the upper mold-block is then placed over the same and driven down upon it by the tamps.

During the making of the conduit the formers or mandrels may be rapped or tapped from time to time to loosen them and prevent the material from clinging too forcibly about them. It is for this reason that I have said that the mandrels may not be rigidly secured to their base-plate. To remove the complete conduit from the machine, the upper mold-block is removed and the truck, with the completed conduit, is drawn to a position to enable its shaft to be engaged by the clutch $d^2$, and the mold and conduit are then lifted upward from the truck and formers or mandrels sufficiently to release the conduit from the formers, and it is then removed entirely from the formers by being lifted by a winch. The mold or box and conduit are then taken to the carbonizing-chamber and the casing or box removed from the conduit.

Having thus fully described my invention, I claim and desire to secure by Letters Patent of the United States—

1. In a machine for making multiflue conduits, the combination, with a vertical mold-box, of a series of stationary formers or mandrels within said box and a vertically-reciprocating tamping device consisting of a series of independent and simultaneously-operating tamps shaped to fit around the said mandrels, substantially as set forth.

2. In a machine for making multiflue conduits, the combination, with an upright and vertically-movable mold-box, of a series of stationary formers or mandrels within said box and a vertically-reciprocating tamping device consisting of a series of independent and simultaneously-operating tamps shaped to fit around the said mandrels, substantially as set forth.

3. In a machine for making multiflue conduits, the combination, with a base-plate, of a series of upright formers or mandrels attached thereto, a mold-box inclosing said mandrels and vertically movable in relation thereto and to said base-plate, and a vertically-reciprocating tamping device consisting of a series of independent tamps shaped to fit around the said mandrels, substantially as set forth.

4. The combination, in a machine for making multiflue conduits, of a base-plate carrying a number of stationary vertical formers or mandrels, a mold-box inclosing the mandrels or formers, a series of tamps, $A^2$, suspended from a drop carriage or head by means of the rods $a$, said rods having a limited independent movement in relation to each other in the head or carriage, and devices, substantially as specified, for lifting the carriage and permitting it to drop, substantially as described.

5. The combination, in a machine for making multiflue conduits, of a series of tamps, $A^2$, a head or carriage for supporting the same, devices for lifting the head vertically and for releasing it to permit it to drop, a yielding connection between each of the tamps and the head, and guides for directing the vertical movement of the tamps, substantially as described.

6. The combination, in a machine for making multiflue conduits, of a number of stationary vertical mandrels, a mold-box inclosing the same, the drop sectional tamps $A^2$, and the removable block F, having an under surface adapted to finish one end of a conduit and a flat upper surface against which the tamps are brought in contact, as and for the purposes specified.

7. The combination, in an apparatus for the manufacture of multiflue conduits, of a truck mounted upon horizontal tracks, a bed or plate carried by said truck and supporting a number of vertical mandrels, a mold-box inclosing said mandrels and carried by said trucks, and a mold-box-lifting device, also supported by said truck, for lifting the mold-box and conduit-section therein contained longitudinally in relation to the formers, as and for the purposes specified.

8. In an apparatus for the manufacture of multiflue conduits, a frame having vertical ways for the vertical travel of a carriage or head, said carriage or head, and a series of tamps carried by said carriage or head, a lifting mechanism for lifting the carriage or head and tamps attached thereto vertically, a releasing device for releasing the carriage or head from the operation of the lifting mechanism to permit it to drop, horizontal tracks below said carriage or head and extending horizontally from said frame, a truck horizontally movable upon said track, a mold-box, formers, and a lifting device for lifting the mold-box relatively to the formers carried by said truck, as and for the purposes specified.

9. In a machine for making multiflue conduits, in combination with a gang or group of vertically-movable tamps, $A^2$, a truck, $B'$, the mandrels or formers $C'$, mounted thereon, the mold-box C, movable vertically in relation to the mandrels, and mold-box-lifting device carried by the truck, comprising the screws $d^9$, the gear-wheels $d^8$ and $d^7$, shaft $d^6$, bevel-gear $d^5$ $d^4$, and shaft $d^3$, carrying one member of a clutch, as and for the purposes described.

10. The combination, with the movable carriage or head $A'$, provided with the spring-latch G, of the rod $g^2$ and the sleeve $g'$, pivoted on the said rod and provided with the teeth $g$ and the operating-handle $g^3$, substantially as set forth.

GEORGE RICHARDSON.

In presence of—
F. F. RAYMOND, 2d,
J. M. DOLAN.